Jan. 27, 1959  A. P. LINQUIST  2,870,976
CORE ATTACHMENT FOR PICTURE SCREENS
Filed Dec. 1, 1953
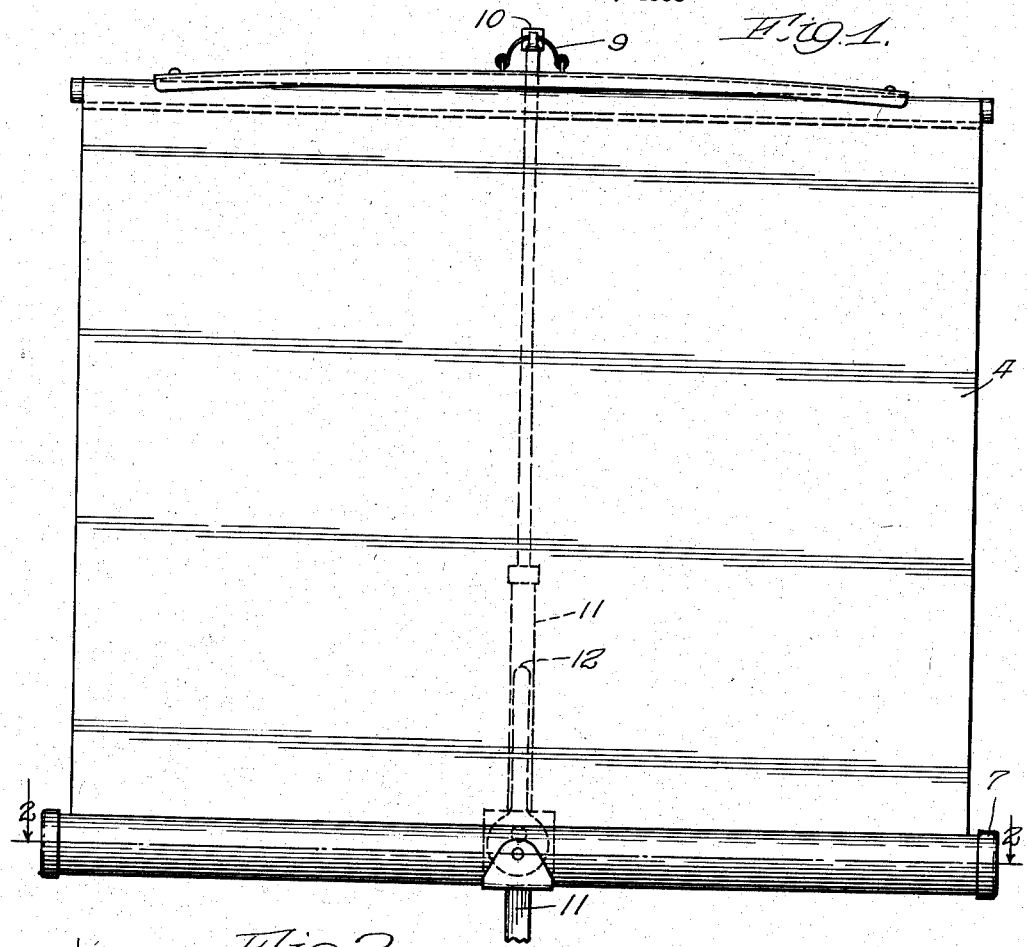
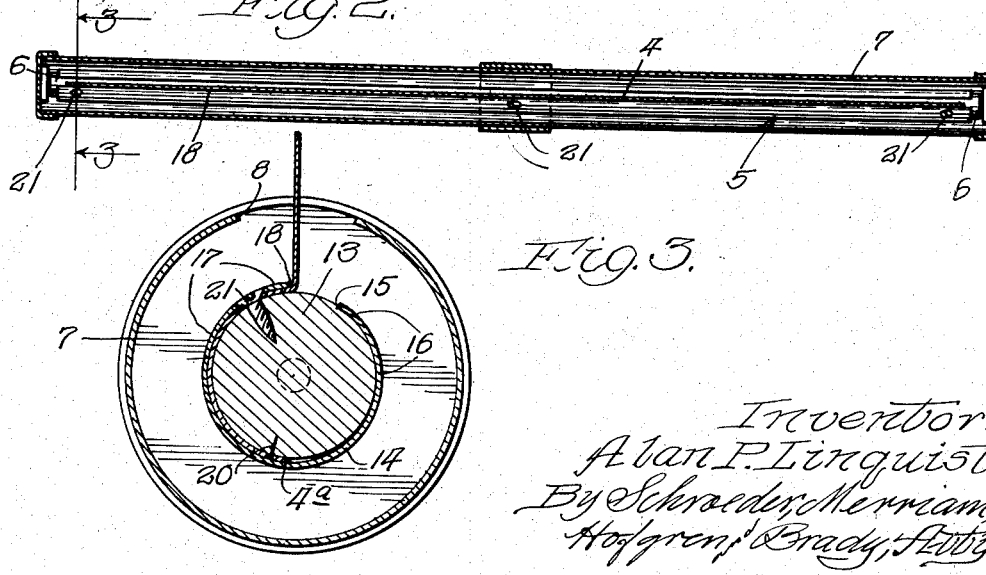
Inventor:
Alan P. Linquist,
By Schroeder, Merriam,
Hofgren & Brady, Attys.

United States Patent Office 2,870,976
Patented Jan. 27, 1959

2,870,976

CORE ATTACHMENT FOR PICTURE SCREENS

Alan P. Linquist, Park Ridge, Ill., assignor to Knox Manufacturing Company, a corporation of Illinois Application December 1, 1953, Serial No. 395,357

1 Claim. (Cl. 242—74)

This invention relates to a screen reel for a picture screen stand, and to a method for securing a picture screen to such a reel.

The rapid growth in color and stereo picture projection for the home has hastened the development of the present invention. Stereo and color pictures are shown to best effect on smooth taut screen surfaces. If a wrinkled or wavy surface is used, an interference pattern is set up which darkens the wrinkled portion of the picture. In addition, it is personally unpleasant to view a picture projected upon a wrinkled screen surface.

In order to provide taut screen surfaces for portable picture screens, screen tensioning devices have been developed, an example being the tensioning device shown in the application of Edward J. Petrick, Serial No. 363,121, now Patent No. 2,793,687. Heretofore, these screens have been attached to their reels by stapling or sewing, but the tensioning devices now used exert forces too great for such attachment. The former manner of attachment has also been objectionable because, in winding the screen on the reel, the marginal edge portion secured to the screen made a series of creases running horizontally across the screen which would not disappear even after tensioning of the screen. The present invention obviates both of these difficulties in that it securely anchors the lower edge of the screen to the reel along the entire screen width, and it eliminates any raised portions tending to crease the screen when in closed position.

The primary object of the present invention is to provide a screen reel which will securely anchor the lower marginal edge portion of a screen across its entire width when the picture screen is subjected to tensioning forces in open position.

Another object is to provide a reel which will present a smooth lateral surface so that a picture screen will not be creased or wrinkled when it is wound into closed position upon the reel.

A further object is to provide a simple and inexpensive method by which a picture screen may be securely anchored upon a screen reel.

The invention is illustrated in a preferred embodiment in the accompanying drawings, in which:

Fig. 1 is a fragmentary elevational view of a picture screen of the type in which the present invention may be utilized;

Fig. 2 is a sectional view taken as indicated on line 2—2 of Fig. 1; and

Fig. 3 is a sectional view taken as indicated on line 3—3 of Fig. 2.

In the embodiment illustrated, a picture screen 4 is attached along a marginal edge portion 4a to a screen reel, generally designated 5, which is journaled at its ends 6 in a protective casing 7. The reel is spring wound and operates in much the same manner as a window shade roller. To extend the screen 4 into open position, the screen is pulled outwardly of the protective casing 7 through the longitudinal slot 8 and suspended by the bail 9 on a hook 10 at the top of the picture screen stand 11, not completely shown.

The lever 12 in dotted outline represents the stretching device described in the application referred to above. For the purposes of this invention it is sufficient to say that 180° rotation of the lever from its position shown in Fig. 1 operates to lower the protective casing, and the roller journaled therein, to apply stretching forces to the picture screen.

The reel 5 is preferably formed from an elongated cylindrical core member 13 of wood surrounded by a sleeve 14 having a longitudinal split 15 therein. The sleeve is usually made of a spring metal or other resilient material, and is preferably slightly helical in cross section so that the radius of curvature increases from the core-conforming segment 16 to the outer end of the screen-wedging segment 17 by approximately 1/64 inch. This difference in the radii of curvature about the inner surface of the sleeve represents the approximate thickness of the material in a picture screen. The edge 18 along one side of the longitudinal split 15 in the sleeve 14 is rounded to prevent snagging and wear of the picture screen during repeated extensions and rewindings of the screen. Although not shown, it is clear that the sleeve may be formed so that, viewed in cross section, the helix of the sleeve passes through an angle greater than 360° and edge 18 overlaps the core-conforming segment 16.

To secure the screen to the reel, the marginal edge portion 4a is first secured to the core member 13 as by staples 20. Next, the sleeve 14 is positioned over the central core member so that the attached marginal edge portion is visible through the split 15 in the sleeve. The core member is then turned axially with respect to the sleeve so that the attached marginal edge portion of the screen progresses between the core member and the screen-wedging segment 17 of the sleeve 14 toward the core-conforming segment 16 so that the marginal edge portion 4a becomes tightly wedged between the core member and the sleeve.

To lend added strength to the attachment of the screen to the reel, wood screws 21 may be inserted through the sleeve 14 near the edge 18 into the core member 13. These screws are inserted at such an angle as to compress the screen-wedging segment 17 tightly against the adjacent screen portion and core member, and to apply pinching forces between the core member and the sleeve upon the marginal edge portion 4a of the screen. In addition, the screws lend added assurance that the core member and sleeve will not rotate with respect to one another.

The scope of the present invention contemplates any other means besides wood screws 21 which would cooperate with the screen-wedging segment 17 to clamp the marginal edge portion 4a of the screen tightly between the core member 13 and the sleeve 14.

The foregoing detailed description is given for clearness of understanding only and no unnecessary limitations should be understood therefrom, for some modifications will be obvious to those skilled in the art.

I claim:

In a picture screen stand adapted to support an extensible picture screen along its marginal edge portions in open position, a spring-wound reel for winding the screen into closed position, comprising: an elongated cylindrical core member having a circular cross section; means securing one marginal edge portion of the screen to said core member; a resilient, longitudinally split sleeve positioned over the core member so that the screen projects outwardly from the split in the sleeve, the cross section of said sleeve in unstressed condition being such that the inner surface of said sleeve along one side of said longitudinal split forms a core-conforming segment, and the inner surface of the sleeve along the other side of said split forms a screen-wedging segment having a radius of curvature slightly greater than that of the circular core member, said one marginal edge portion of the screen extending between the core member and the screen-wedging segment and being securely wedged substantially along its entire length between the core member and a longitudinal portion of the screen-wedging segment; and anchoring means extending between the core member and the screen-wedging segment through said one marginal edge portion to press said screen-wedging segment with uniform pressure against the entire width of the interposed marginal edge portion of the screen and to hold said sleeve and core member against relative movement.

References Cited in the file of this patent

UNITED STATES PATENTS

| | | |
|---|---|---|
| 653,796 | Ettinger | July 17, 1900 |
| 673,091 | Shepard | Apr. 30, 1901 |
| 707,098 | Garrison | Aug. 19, 1902 |
| 1,013,882 | Lasker | Jan. 9, 1912 |
| 1,759,095 | Coker | May 20, 1930 |
| 2,022,807 | Hagerty | Dec. 3, 1935 |

FOREIGN PATENTS

| | | |
|---|---|---|
| 132,835 | Great Britain | Oct. 2, 1916 |